United States Patent
Douglass et al.

(10) Patent No.: US 11,852,518 B2
(45) Date of Patent: Dec. 26, 2023

(54) RESISTIVE WIRE WIRING SHIELD TO PREVENT ELECTROMAGNETIC INTERFERENCE

(71) Applicant: The Boeing Company, Chicago, IL (US)

(72) Inventors: Andrew F. Douglass, Bellevue, WA (US); Andrew M. Robb, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/670,853

(22) Filed: Feb. 14, 2022

(65) Prior Publication Data

US 2022/0373380 A1   Nov. 24, 2022

Related U.S. Application Data

(60) Provisional application No. 63/190,722, filed on May 19, 2021.

(51) Int. Cl.
*G01F 23/22* (2006.01)
*G01F 23/263* (2022.01)
*B64D 45/02* (2006.01)

(52) U.S. Cl.
CPC ........... *G01F 23/263* (2013.01); *B64D 45/02* (2013.01); *G01F 23/22* (2013.01)

(58) Field of Classification Search
CPC .......... G01F 23/22–2968; B64D 45/02; B64D 37/32
See application file for complete search history.

(56) References Cited

U.S. PATENT DOCUMENTS

| 4,253,332 A | 3/1981 | Sabatino et al. |
| 4,987,776 A | 1/1991 | Koon |

(Continued)

FOREIGN PATENT DOCUMENTS

| CN | 104372281 A | 2/2015 |
| EP | 0680878 A1 * | 4/1995 |
| JP | 2015079665 A * | 4/2015 |

OTHER PUBLICATIONS

Extended European Search Report dated Jul. 24, 2020 for European Patent Application No. 20161822.0, 7 pages.

(Continued)

*Primary Examiner* — Justin N Olamit
(74) *Attorney, Agent, or Firm* — SAGE PATENT GROUP

(57) ABSTRACT

A system includes a fuel level sensing probe inside a fuel tank and an exciter wire bundle to connect the fuel level sensing probe to a power source outside the tank. The exciter wire bundle includes an excitation wire and a grounded guard wire. The excitation wire and the grounded guard wire each include a resistive non-metallic wire. The system also includes a return signal wire bundle to connect the fuel level sensing probe to a device configured to measure a quantity of fuel within the tank. The return signal wire bundle includes a return signal wire and a grounded guard wire. The grounded guard wire of the return signal wire bundle and the grounded guard wire of the exciter wire bundle are configured to shield the return signal wire from electromagnetic interference. The return signal wire and the grounded guard wire each include a resistive non-metallic wire.

17 Claims, 8 Drawing Sheets

(56) References Cited

U.S. PATENT DOCUMENTS

| | | |
|---|---|---|
| 5,067,099 A | 11/1991 | McCown et al. |
| 5,097,099 A | 3/1992 | Miller |
| 5,560,340 A | 10/1996 | Tomisawa |
| 5,814,830 A | 9/1998 | Crowne |
| 6,164,266 A | 12/2000 | Just et al. |
| 7,006,339 B2 * | 2/2006 | Maier .................. B64D 37/32 174/359 |
| 8,281,655 B2 | 10/2012 | Bahorich et al. |
| 8,987,612 B2 * | 3/2015 | Callahan ................ B32B 37/14 174/653 |
| 9,299,471 B1 * | 3/2016 | Robb ...................... H01B 1/00 |
| 9,520,705 B2 * | 12/2016 | Trifeletti ................ H02G 13/40 |
| 9,851,285 B2 * | 12/2017 | Bahorich ............... G01N 33/22 |
| 10,429,228 B2 * | 10/2019 | Robb .................... G01F 23/266 |
| 10,564,022 B2 | 2/2020 | Olson |
| 10,641,645 B2 | 5/2020 | Bellinger et al. |
| 10,754,101 B1 | 8/2020 | Chan et al. |
| 2002/0065582 A1 | 5/2002 | Morrison et al. |
| 2004/0079150 A1 | 4/2004 | Breed et al. |
| 2004/0187614 A1 | 9/2004 | Atmur |
| 2007/0127521 A1 | 6/2007 | Sandell et al. |
| 2007/0129902 A1 | 6/2007 | Orbell |
| 2014/0102757 A1 | 4/2014 | Trifeletti |
| 2014/0331763 A1 | 11/2014 | Robb et al. |
| 2017/0363049 A1 | 12/2017 | Yoon et al. |
| 2018/0299312 A1 | 10/2018 | Olson |
| 2019/0204135 A1 | 7/2019 | Lee et al. |
| 2020/0298989 A1 | 9/2020 | Robb |
| 2020/0298990 A1 | 9/2020 | Robb |
| 2020/0298991 A1 | 9/2020 | Robb |
| 2020/0326224 A1 | 10/2020 | Chan et al. |

OTHER PUBLICATIONS

Extended European Search Report dated Sep. 21, 2022 for European Patent Application No. 22165263.9, 8 pages.

* cited by examiner

RESISTIVE WIRE WIRING SHIELD TO PREVENT ELECTROMAGNETIC INTERFERENCE

CROSS-REFERENCE TO RELATED APPLICATIONS

This application claims the benefit of priority of U.S. Provisional Application No. 63/190,722, filed May 19, 2021, which is incorporated herein by reference in its entirety.

This application is related to U.S. patent application Ser. No. 16/670,229, entitled "Electric Power and Data Communications within a Fuel Tank and across a Wall of the Fuel Tank Using Resistive Non-Metallic Wire," filed Oct. 31, 2019, and assigned to the assignee as the present application.

This application is related to U.S. patent application Ser. No. 16/670,257, entitled "Electric Power and Data Communications within a Fuel Tank and across a Wall of the Fuel Tank Using Resistive Non-Metallic Wire and an Optical Hybrid Fuel Height Sensor," filed Oct. 31, 2019, and assigned to the same assignee as the present application.

This application is also related to U.S. patent application Ser. No. 16/670,286, entitled "Electric Power and Data Communications within a Fuel Tank and across a Wall of the Fuel Tank Using Resistive Non-Metallic Wire and a Sealed Active Connector," filed Oct. 31, 2019, and assigned to the same assignee as the present application.

FIELD

The present disclosure relates generally to vehicles, such as aircraft, and more particularly to a resistive wire wiring shield to prevent electromagnetic interference.

BACKGROUND

Installation of electrically conductive materials in a fuel tank requires significant design detail and consideration to minimize a possibility of an electrical discharge within the fuel tank. Historically, non-metallic conductors such as carbon loaded plastics and foams have been widely used for shielding and anti-static applications. When exposed to transient electric fields these materials are resistant to the high current flows and sparks that would ignite fuels. Additionally, fuel tanks are confined spaces and excitation wires and return signal wires connected to fuel level sensing probes inside a fuel tank need to be configured to prevent electromagnetic interference.

SUMMARY

In accordance with an example, a system includes a fuel level sensing probe inside a fuel tank. The system also includes an exciter wire bundle configured to electrically connect the fuel level sensing probe to an electric power source outside the fuel tank. The exciter wire bundle includes an excitation wire and a grounded guard wire. The excitation wire and the grounded guard wire each include a resistive non-metallic wire. The system also includes a return signal wire bundle configured to electrically connect the fuel level sensing probe to a device configured to measure a quantity of fuel within the fuel tank by using a return signal from the fuel level sensing probe. The return signal wire bundle includes a return signal wire and a grounded guard wire. The grounded guard wire of the return signal wire bundle and the grounded guard wire of the exciter wire bundle are configured to shield the return signal wire from electromagnetic interference. The return signal wire and the grounded guard wire each comprise a resistive non-metallic wire.

In accordance with another example, a vehicle includes a fuel tank and a system for measuring a quantity of fuel in the fuel tank. The system includes a fuel level sensing probe inside the fuel tank. The system also includes an exciter wire bundle configured to electrically connect the fuel level sensing probe to an electric power source outside the fuel tank. The exciter wire bundle includes an excitation wire and a grounded guard wire. The excitation wire and the grounded guard wire includes a resistive non-metallic wire. The system further includes a return signal wire bundle configured to electrically connect the fuel level sensing probe to a device configured to measure a quantity of fuel within the fuel tank by using a return signal from the fuel level sensing probe. The return signal wire bundle includes a return signal wire and a grounded guard wire. The grounded guard wire of the return signal wire bundle and the grounded guard wire of the exciter wire bundle are configured to shield the return signal wire from electromagnetic interference. The return signal wire and the grounded guard wire comprise a resistive non-metallic wire.

In accordance with another example, a method includes providing one or more fuel level sensing probes inside a fuel tank. The method also includes providing an exciter wire bundle configured to electrically connect the fuel level sensing probe to an electric power source outside the fuel tank. The exciter wire bundle includes an excitation wire and a grounded guard wire. The excitation wire and the grounded guard wire comprise a resistive non-metallic wire. The method also includes providing a return signal wire bundle configured to electrically connect the fuel level sensing probe to a device configured to measure a quantity of fuel within the fuel tank by using a return signal from the fuel level sensing probe. The return signal wire bundle includes a return signal wire and a grounded guard wire. The grounded guard wire of the return signal wire bundle and the grounded guard wire of the exciter wire bundle are configured to shield the return signal wire from electromagnetic interference. The return signal wire and the grounded guard wire comprise a resistive non-metallic wire.

In accordance with an example and any of the preceding examples, the system, vehicle or method further include a plurality of fuel level sensing probes disposed at predetermined different locations within the fuel tank to accurately measure the quantity of fuel within the fuel tank. The exciter wire bundle includes a plurality of excitation wires and one or more grounded guard wires. Each excitation wire is electrically connected to a respective one of the plurality of fuel level sensing probes. The return signal wire bundle includes a plurality of return signal wires and one or more grounded guard wires. Each return signal wire is electrically connected to a respective one of the plurality of fuel level sensing probes.

The features, functions, and advantages that have been discussed can be achieved independently in various examples or may be combined in yet other examples further details of which can be seen with reference to the following description and drawings.

DETAILED DESCRIPTION

Figure 1:
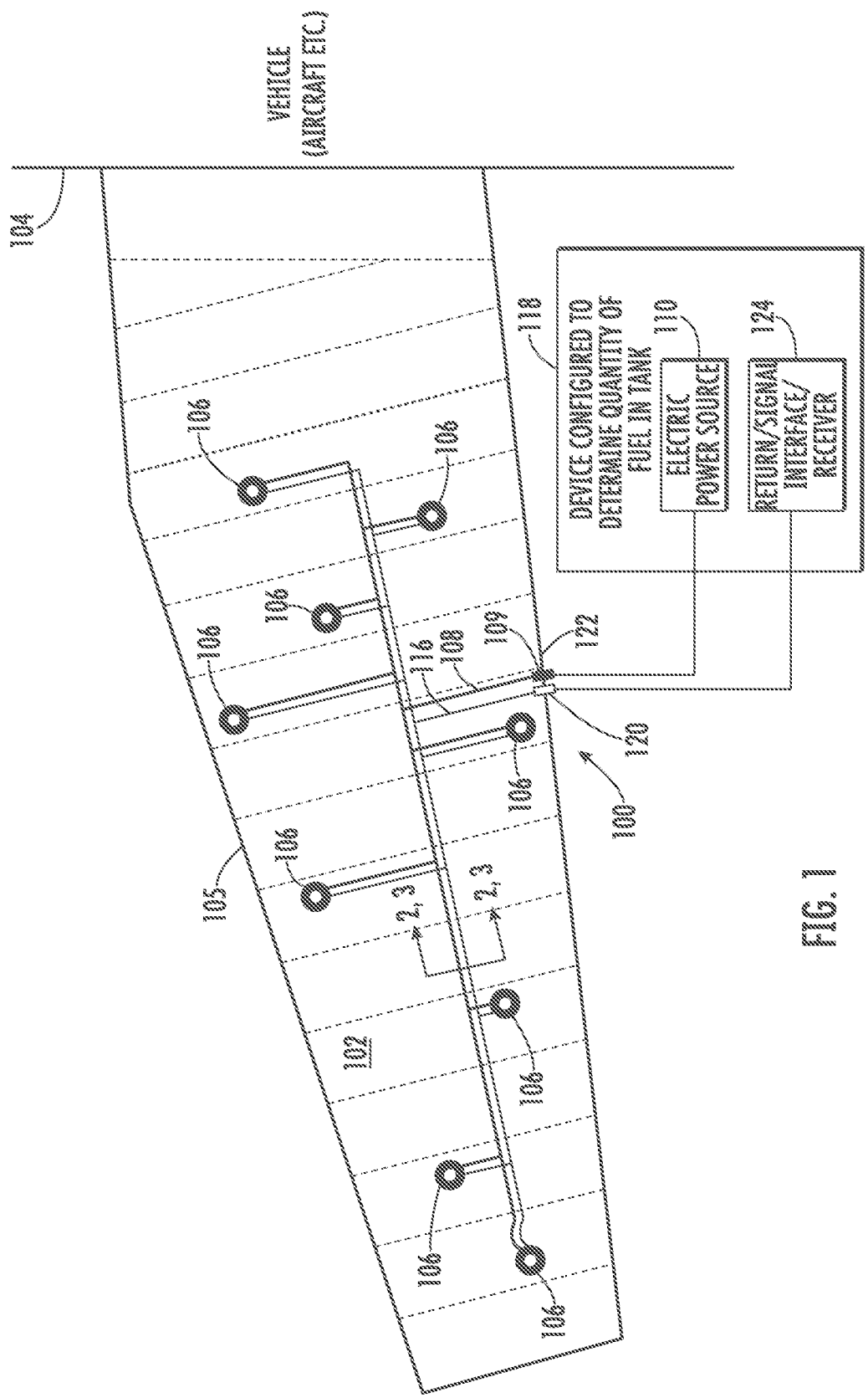
FIG. 1 is an illustration of a fuel tank in a vehicle and a system for measuring or determining a quantity of fuel in the fuel tank in accordance with an example of the present disclosure.

The following detailed description of examples refers to the accompanying drawings, which illustrate specific examples of the disclosure. Other examples having different structures and operations do not depart from the scope of the present disclosure. Like reference numerals may refer to the same element or component in the different drawings.

In accordance with examples of the present disclosure, a system for determining or measuring a quantity of fuel in a fuel tank includes one or more fuel level sensing probes inside the fuel tank. The system also includes an exciter wire bundle configured to electrically connect each fuel level sensing probe to an electric power source outside the fuel tank. The exciter wire bundle includes an excitation wire for each fuel level sensing probe and a grounded guard wire configured to couple to the excitation wire or each excitation wire for preventing electromagnetic interference from the excitation wire or wires. The excitation wire and the grounded guard wire each includes a resistive non-metallic wire. The system additionally includes a return signal wire bundle configured to electrically connect each fuel level sensing probe to a device configured to determine or measure a quantity of fuel within the fuel tank by using a return signal from each fuel level sensing probe. The return signal wire bundle includes a return signal wire for each fuel level sensing probe and a grounded guard wire. The grounded guard wire of the return signal bundle and the grounded guard wire of the exciter wire bundle are configured to shield the return signal wire or each return signal wire from electromagnetic interference. The return signal wire and the grounded guard wire each include a resistive non-metallic wire. The grounded guard wire causes an exciter field (produced by the signal carrying wires) to couple to the grounded guard wire rather than the signal/return or return signal wires which substantially cancels the electromagnetic interference created by the exciter field. Routing a grounded guard wire in the exciter wire bundle and/or the return signal wire bundle is a simpler and less expensive means to achieve similar results to a shield between the excitation wires and the return signal wires for less cost and complexity. The exciter wire bundle and the return signal wire bundle can also be routed together with a separation of about 0.5 inches with the grounded guard wires compared to at least 2 inches without the grounded guard wires. This significantly reduces the amount of work in the confined space of a fuel tank and reduces build time for installation. In accordance with an example, a vehicle, such as an aircraft includes a system for determining or measuring the quantity of fuel in a fuel tank of the vehicle.

FIG. 1 is an illustration of a fuel tank 102 in a vehicle 104 and a system 100 for measuring or determining a quantity of fuel in the fuel tank 102 in accordance with an example of the present disclosure. The vehicle 104 in FIG. 1 is an aircraft and the fuel tank 102 is inside a wing 105 of the aircraft. In other examples, the fuel tank 102 is any tank for containing a flammable material. In some examples, e.g., an aircraft, the system 100 is also referred to as a fuel management system. The system 100 includes one or more fuel level sensing probes 106 inside the fuel tank 102. In the example in FIG. 1, where the vehicle 104 is an aircraft, the system 100 includes a plurality of fuel level sensing probes 106 disposed at predetermined different locations within the fuel tank 102 to accurately measure the quantity of fuel within the fuel tank 102. An example of a fuel level sensing probe is described in more detail in U.S. patent application Ser. No. 16/670,229, entitled "Electric Power and Data Communications within a Fuel Tank and across a Wall of the Fuel Tank Using Resistive Non-metallic Wire," filed Oct. 31, 2019, is assigned to the same assignee as the present application and is incorporated herein by reference.

The system 100 also includes an exciter wire bundle 108 configured to electrically connect the fuel level sensing probe 106 or probes 106 through a first sealed connector 109 to an electric power source 110 outside the fuel tank 102. The exciter wire bundle 108 includes an excitation wire 202 (FIG. 2) and a grounded guard wire 204 (FIG. 2) configured to couple to the excitation wire 202 when energized or carrying an electrical signal to prevent electromagnetic interference from the excitation wire 202. In accordance with some examples, the exciter wire bundle 108 includes an excitation wire 202 connected to each fuel level sensing probe 106. The excitation wire 202 and the grounded guard wire 204 each include a resistive non-metallic wire. In accordance with an example, the resistive non-metallic wire is a carbon loaded thermoplastic, e.g., a carbon loaded polyether ether ketone (PEEK) thermoplastic. The resistive non-metallic wire includes a resistance between about 100 ohms/meter and about 1 Mega-ohms/meter.

Figure 2:
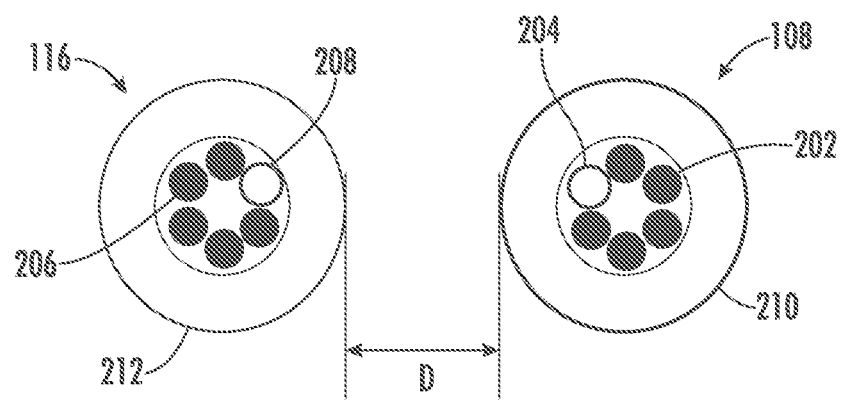
FIG. 2 is a cross-sectional view of an exciter wire bundle and a return signal wire bundle taken along lines 2, 3 in FIG. 1 in accordance with an example of the present disclosure.

The system 100 also includes a return signal wire bundle 116 configured to electrically connect the fuel level sensing probe 106 or probes 106 to a device 118, outside the fuel tank 102, configured to determine or measure a quantity of fuel within the fuel tank 102 by using a return signal from the fuel level sensing probe 106 or return signals from each of the fuel level sensing probes 106. The return signal wire bundle 116 electrically connects the fuel level sensing probe 106 or probes as shown in FIG. 1 through a second sealed connector 120. The return signal wire bundle 116 includes a return signal wire 206 (FIG. 2) and a grounded guard wire 208 (FIG. 2). The grounded guard wire 208 of the return signal wire bundle 116 and/or the grounded guard wire 204 of the exciter wire bundle 108 are configured to shield the return signal wire 206 from electromagnetic interference. In accordance with an example the return signal wire bundle 116 includes a return signal wire 206 from each fuel level sensing probe 106. In the example in FIG. 1, the device 118 includes a return signal interface 124 or receiver configured to receive the return signal from the fuel level sensing probe 106 or probes 106 to measure or determine the quantity of fuel in the fuel tank 102. The return signal wire 206 and the grounded guard wire 208 each include a resistive non-metallic wire. In the example illustrated in FIG. 1, the electric power source 110 is a component of the device 118 configured to measure or determine the quantity of fuel in the fuel tank 102. In other examples, the electric power source 110 is a separate component from the device 118. Examples of the device 118 include but are not necessarily limited to a computer, a probe reader or a data concentrator.

Figure 3A:
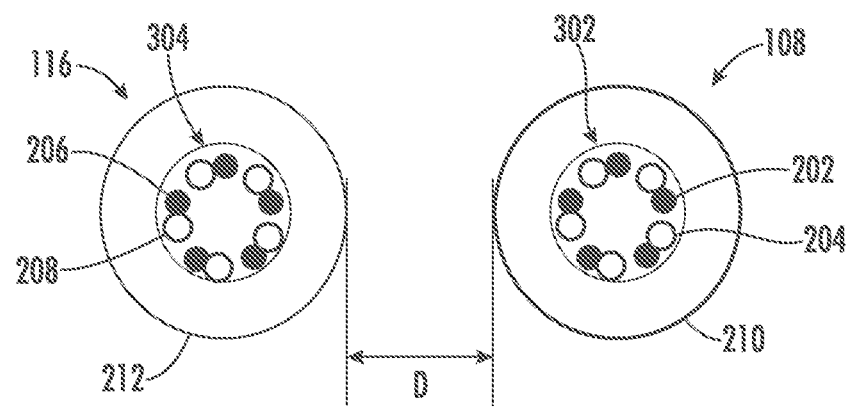
FIG. 3A is a cross-sectional view of an exciter wire bundle and a return signal wire bundle taken along lines 2, 3 in FIG. 1 in accordance with another example of the present disclosure.

As previously described, the system 100 in the example in FIG. 1 includes a plurality of fuel level sensing probes 106 disposed at predetermined different locations within the fuel tank 102 to accurately measure the quantity of fuel within the fuel tank 102. The exciter wire bundle 108 includes a plurality of excitation wires 202 and one or more grounded guard wires 204 (FIGS. 2 and 3A). Each excitation wire 202 is electrically connected to a respective one of the plurality of fuel level sensing probes 106. The return signal wire bundle 116 includes a plurality of return signal wires 206 and one or more grounded guard wires 208. Each return signal wire 206 is electrically connected to a respective one of the plurality of fuel level sensing probes 106.

Referring also to FIG. 2, FIG. 2 is a cross-sectional view of an exciter wire bundle 108 and a return signal wire bundle 116 taken along lines 2-2 in FIG. 1 in accordance with an example of the present disclosure. The exciter wire bundle 108 includes a single grounded guard wire 204 and a plurality of excitation wires 202. In some examples, the single grounded guard wire 204 and the plurality of excitation wires 202 are twisted together to form the exciter wire bundle 108. The excitation wires 202 couple to the single grounded guard wire 204 when the excitation wires 202 are energized or carry an electrical signal to prevent electromagnetic interference from the excitation wires 202. The exciter wire bundle 108 also includes a jacket 210 of insulation material to protect the excitation wires 202 and the grounded guard wire 204.

In the example in FIG. 2, the return signal wire bundle 116 also includes a single grounded guard wire 208 and a plurality of return signal wires 206. In some examples, the single grounded guard wire 208 and the plurality of return signal wires 206 are twisted together to form the return signal wire bundle 116 and to shield the return signal wires 206 from the electromagnetic interference, e.g., electromagnetic interference from the excitation wires 202. The return signal wire bundle 116 also includes a jacket 212 of insulation material to protect the return signal wires 206 and the grounded guard wire 208. The exciter wire bundle 108 and the return signal wire bundle 116 are also spaced a predetermined distance "D" apart to prevent electromagnetic interference from the exciter wire bundle 108 to the return signal wire bundle 116. For example, the predetermined distance "D" is about 0.5 inches.

Figure 3B:
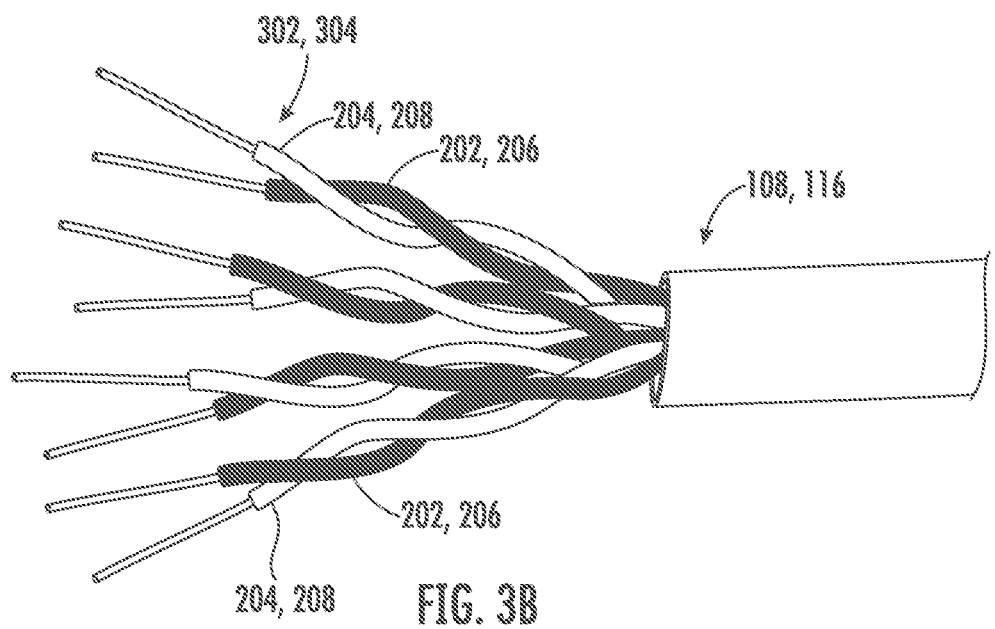
FIG. 3B is an illustration of an example of either the exciter wire bundle or the return signal wire bundle in FIG. 3A showing a grounded guard wire twisted with each excitation wire or return signal wire in accordance with an example of the present disclosure.

Referring also to FIGS. 3A and 3B, FIG. 3A is a cross-sectional view of an exciter wire bundle 108 and a return signal wire bundle 116 taken along lines 3-3 in FIG. 1 in accordance with another example of the present disclosure. FIG. 3B is an illustration of an example of either the exciter wire bundle 108 or the return signal wire bundle 116 in FIG. 3A showing a grounded guard wire 204 or 208 twisted with each exciter wire 202 or return signal wire 206 in accordance with an example of the present disclosure. In the example in FIGS. 3A and 3B, the exciter wire bundle 108 includes a plurality of grounded guard wires 204 and a plurality of excitation wires 202. Each grounded guard wire 204 forms a twisted pair 302 with one of the plurality of excitation wires 202, as illustrated in FIG. 3B, to form the exciter wire bundle 108 and to electromagnetically couple the excitation wires 202 to the plurality of grounded guard wires 204 when the excitation wires 202 are energized or carry an electrical signal to prevent electromagnetic interference from the excitation wires 202. The exciter wire bundle 108 also includes a jacket 210 of insulation material to protect the excitation wires 202 and the grounded guard wires 204.

In the example in FIGS. 3A and 3B, the return signal wire bundle 116 includes a plurality of grounded guard wires 208 and a plurality of return signal wires 206. Each grounded guard wire 208 forms a twisted pair 304 with one of the plurality of return signal wires 206 to form the return signal wire bundle 116. The grounded guard wires 208 of the return wire bundle 116 and/or the grounded guard wires 204 of the exciter wire bundle 108 are configured to shield the return signal wires 206 from the electromagnetic interference. The return signal wire bundle 116 also includes a jacket 212 of insulation material to protect the return signal wires 206 and the grounded guard wires 208. The exciter wire bundle 108 and the return signal wire bundle 116 are also spaced a predetermined distance "D" apart to prevent electromagnetic interference between the exciter wire bundle 108 and the return signal wire bundle 116. For example, the predetermined distance "D" is about 0.5 inches.

Figure 4:
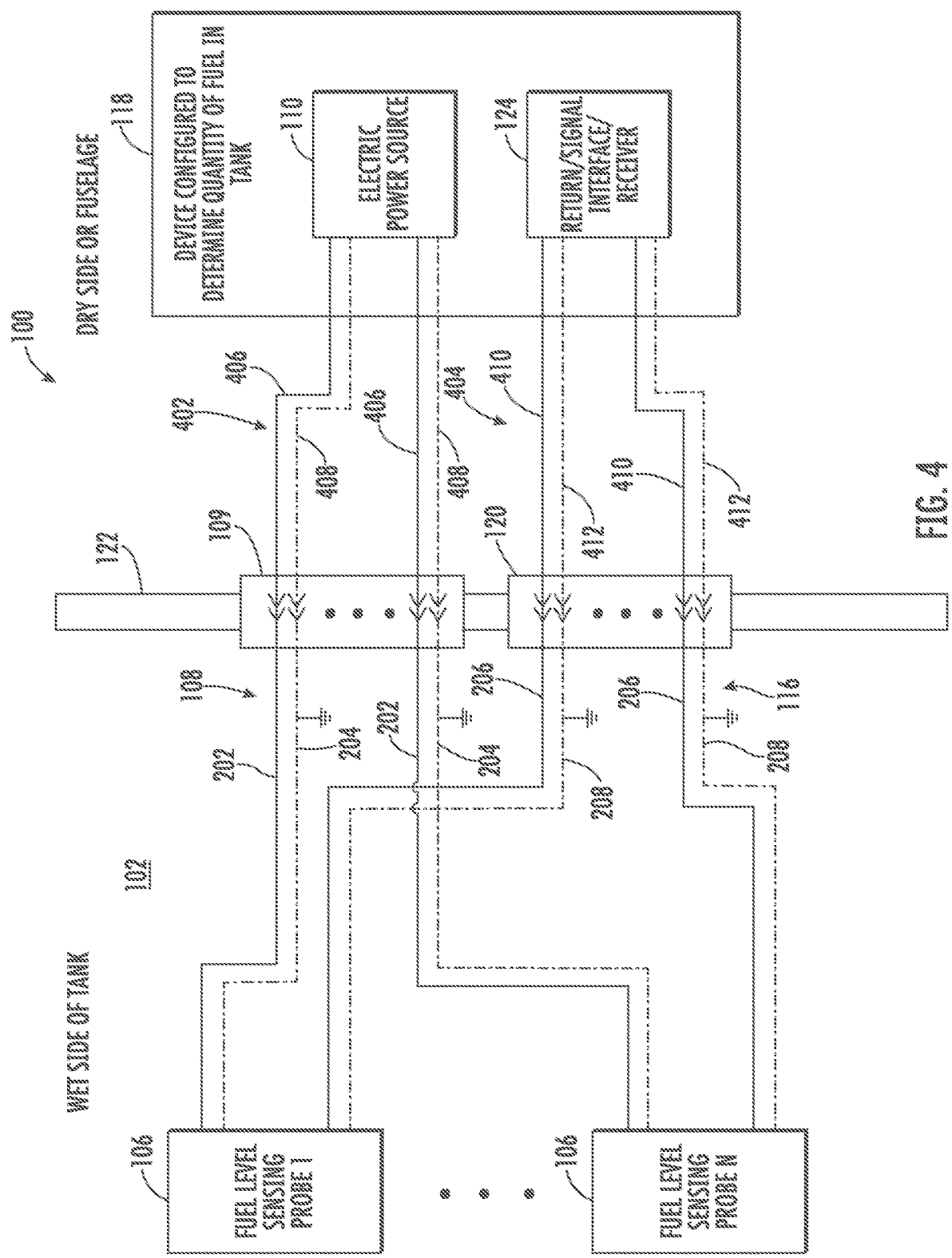
FIG. 4 is a block schematic diagram of an example of a system to determine a quantity of fuel in a fuel tank in accordance with an example of the present disclosure.

FIG. 4 is a block schematic diagram of the exemplary system 100 in FIG. 1. As previously described, the system 100 includes a first sealed connector 109 extending through a wall 122 of the fuel tank 102. The first sealed connector 109 is configured to electrically connect the plurality of excitation wires 202 to the electrical power source. The system 100 also includes a second sealed connector 120 extending through the wall 122 of the fuel tank 102. The second sealed connector 120 is configured to electrically connect the plurality of return signal wires 206 to the device 118 configured to measure the quantity of fuel within the fuel tank 102. The exciter wire bundle 108 extends between each fuel level sensing probe 106 and the first sealed connector 109. One of the excitation wires 202 and a grounded guard wire 204 branches off from the exciter wire bundle 108 to connect to each fuel level sensing probe 106. The return signal wire bundle 116 extends between each fuel level sensing probe 106 and the second sealed connector 120. One of the return signal wires 206 and a grounded guard wire 208 branches off from the return signal wire bundle 116 to connect to each fuel sensing probe 106. The exciter wire bundle 108 electrically connects each fuel level sensing probe 106 to the first sealed connector 109 and the return signal wire bundle electrically connects each fuel sensing probe to the second sealed connector 120. In some examples, at the first sealed connector 109, the exciter wire bundle 108 transitions to metallic wiring outside of the fuel tank 102, and at the second sealed connector 120, the return signal wire bundle 116 also transitions to metallic wiring outside the fuel tank 102. The first sealed connector 109 is configured to connect the exciter wire bundle 108 to an external exciter wire bundle 402 outside the fuel tank 102 and the second sealed connector 120 is configured to connect the return signal wire bundle 116 to an external return signal wire bundle 404 outside the fuel tank 102. The external exciter wire bundle 402 includes a plurality of external excitation wires 406 and one or more external grounded guard wires 408 depending on whether the exciter wire bundle 108 inside the fuel tank 102 includes a single grounded guard wire 204 as shown in the example in FIG. 2 or a plurality of grounded guard wires 204 as shown in the example in FIG. 3A. In some examples, the external excitation wires 406 and the external grounded guard wire or wires 408 are a metallic conductive material such as copper. In other examples, the external excitation wires 406 and the external grounded guard wire or wires 408 are a resistive non-metallic wire. The external return signal wire bundle 404 includes a plurality of external return signal wires 410 and an external grounded guard wire or wires 412. In some examples, the external return signal wires 404 and the external grounded guard wire or wires 412 are a metallic electric conductive material such as copper. In other examples, the external return signal wires 410 and the external grounded guard wire or wires 412 are a resistive non-metallic wire.

Figure 5:
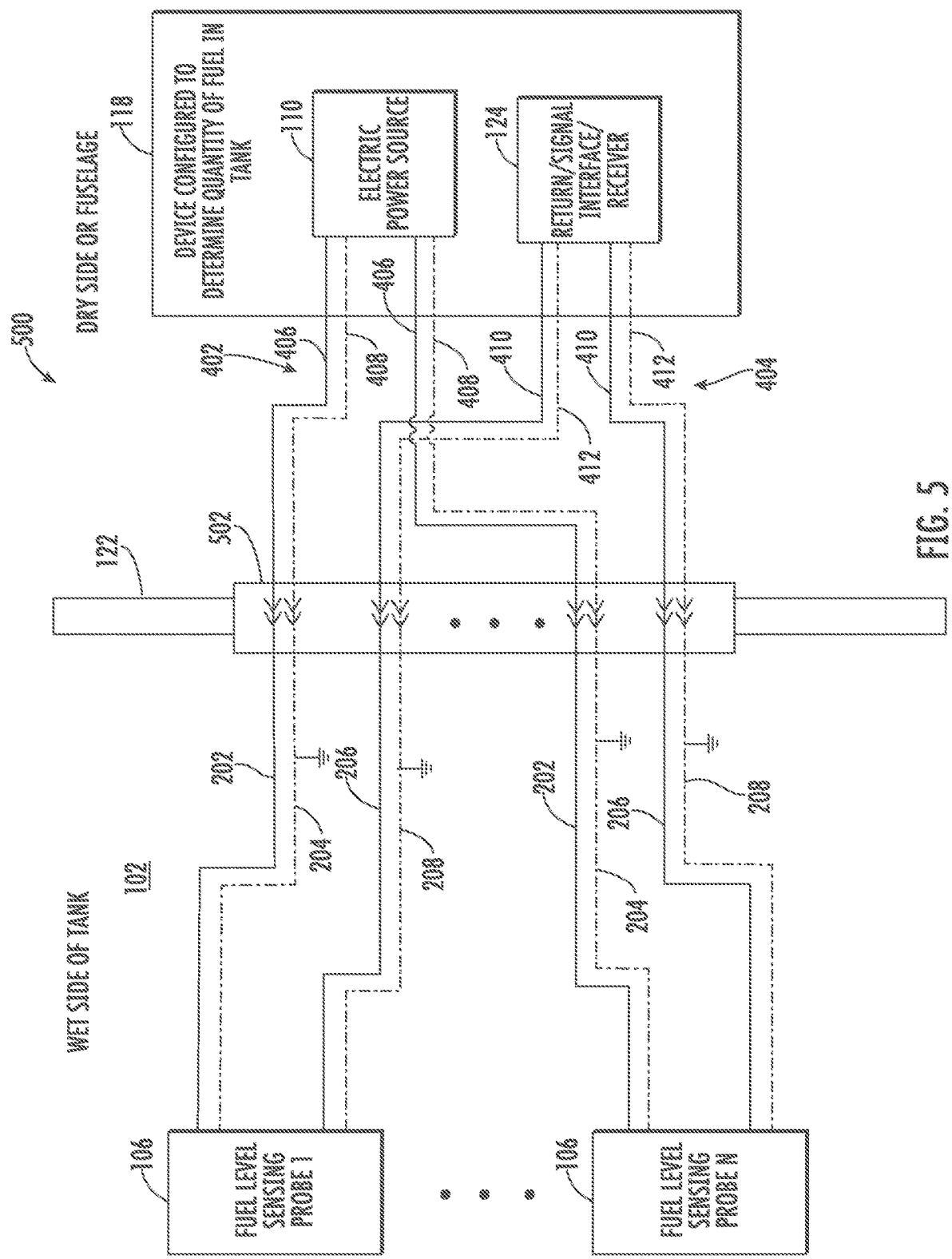
FIG. 5 is a block schematic diagram of an example of a system to determine a quantity of fuel in a fuel tank in accordance with another example of the present disclosure.

FIG. 5 is a block schematic diagram of an example of a system 500 to determine a quantity of fuel in a fuel tank in accordance with another example of the present disclosure. The system 500 is similar to the exemplary system 100 in FIGS. 1 and 4 except the system 500 includes a single sealed connector 502 extending through a wall 122 of the fuel tank 102. The sealed connector 502 is configured to electrically connect the plurality of excitation wires 202 to the electric power source 110 and the plurality of return signal wires 206 to the device 118 configured to measure the quantity of fuel within the fuel tank. In some examples, the external wiring outside the fuel tank 102 is metallic electric conductive material, such as copper.

Figure 6:
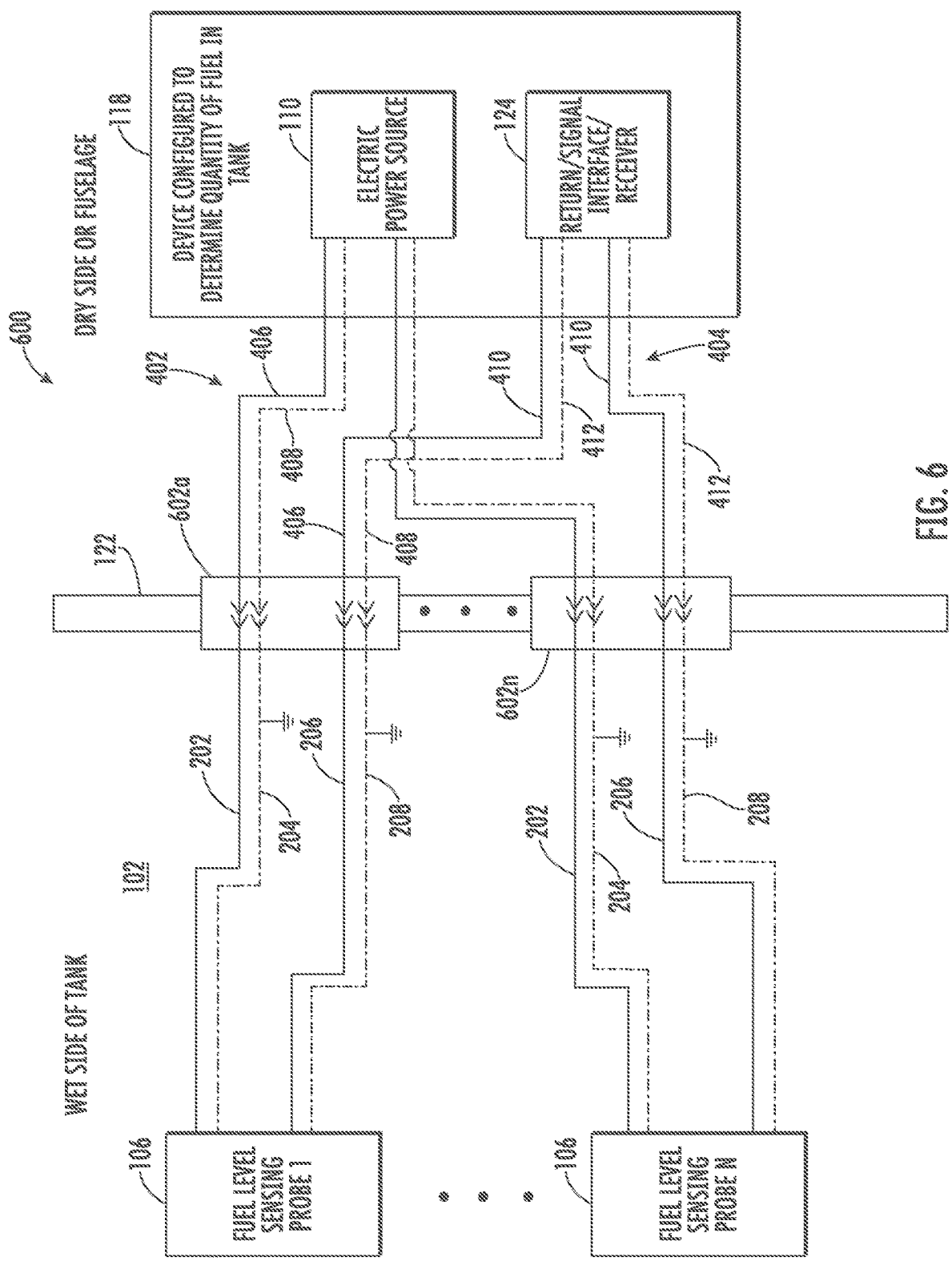
FIG. 6 is a block schematic diagram of an example of a system to determine a quantity of fuel in a fuel tank in accordance with a further example of the present disclosure.

FIG. 6 is a block schematic diagram of an example of a system 600 to determine a quantity of fuel in a fuel tank in accordance with a further example of the present disclosure. The system 600 is similar to the exemplary system 100 in FIGS. 1 and 4 except the system 600 includes a plurality of sealed connectors 602a-602n extending through the wall 122 of the fuel tank 102. One sealed connector 602 is associated with each fuel level sensing probe 106. Each sealed connector 602a-602n extends through a wall 122 of the fuel tank 102 and is configured to electrically connect the excitation wire 202 connected to an associated fuel level sensing probe 106 to the electrical power source 110 and to electrically connect the return signal wire 206 connected to the associated fuel level sensing probe 106 to the device 118 configured to measure the quantity of fuel within the fuel tank 102. In some examples, the external wiring outside the fuel tank 102 is metallic electric conductive material, such as copper.

Figure 7:
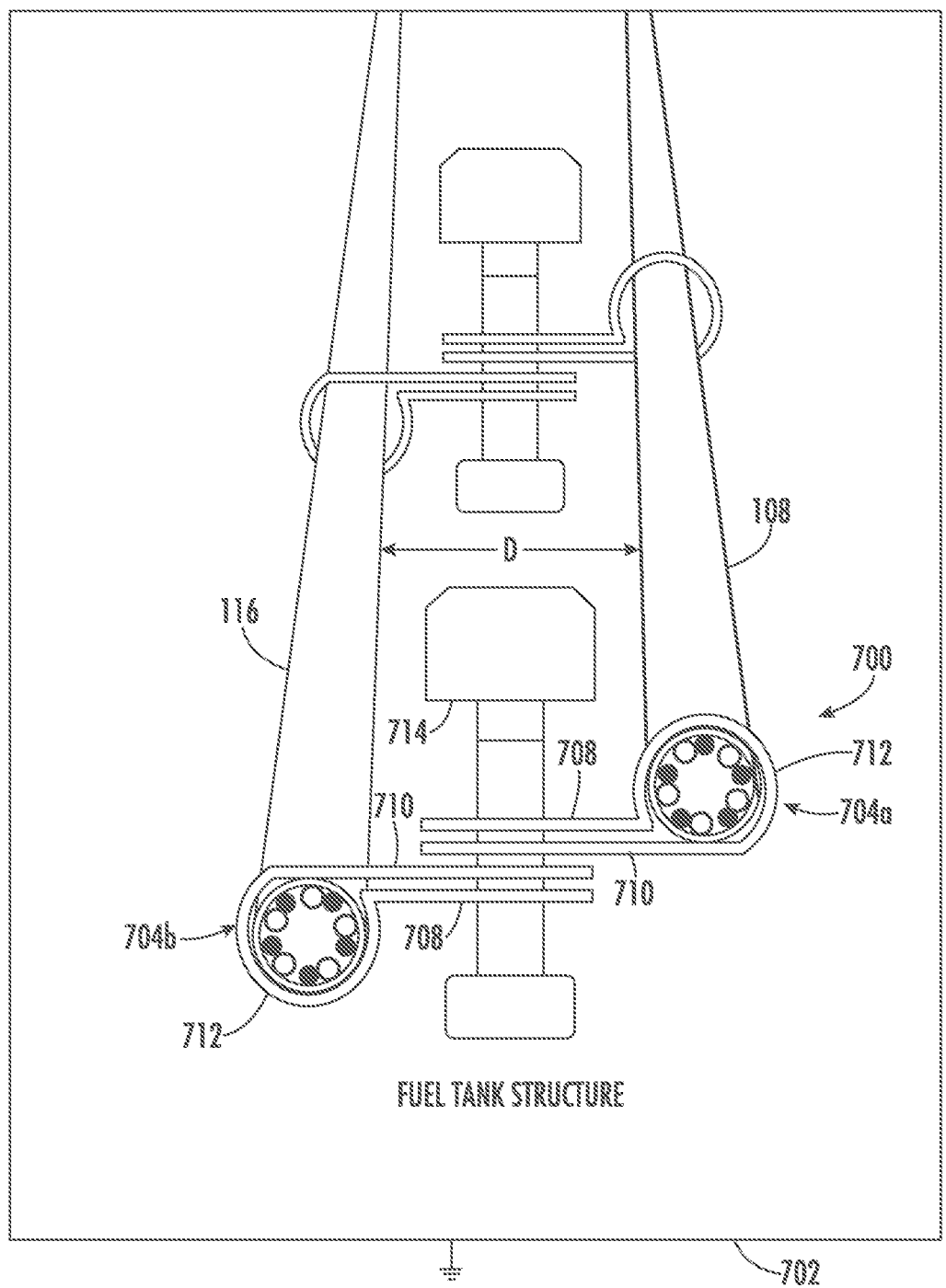
FIG. 7 is an illustration of an example of a clamp assembly configured to fasten the exciter wire bundle and the return signal wire bundle to a grounded structure of a fuel tank in accordance with an example of the present disclosure.

FIG. 7 is an illustration of an example of a clamp assembly 700 configured to fasten the exciter wire bundle 108 and the return signal wire bundle 116 to a grounded structure 702 of the fuel tank 102 within the fuel tank 102 in accordance with an example of the present disclosure. The clamp assembly 700 is also configured to space the bundles 108 and 116 the predetermined distance "D" apart to prevent electromagnetic interference between the exciter wire bundle 108 and the return signal wire bundle 116. The clamp assembly 700 includes a pair of P-shaped clamps 704a and 704b. Each P-shaped clamp 704a and 704b includes a pair of adjacent linear leg portions 708 and 710 at one end and a loop portion 712 integrally formed and extending from the leg portions 708 and 710 at an opposite end. The loop portion 712 is configured to receive one of the wire bundles 108 or 116. A hole (not shown in FIG. 7) is formed through the adjacent linear leg portions 708 and 710 for receiving a fastener 714. The P-shaped clamps 704a and 704b are attached to the grounded fuel tank structure 702 with the loop portions 712 of the P-shaped clamps 704a and 704b opposite one another to provide the predetermined distance "D" between the exciter wire bundle 108 and the return signal wire bundle 116.

Figure 8:
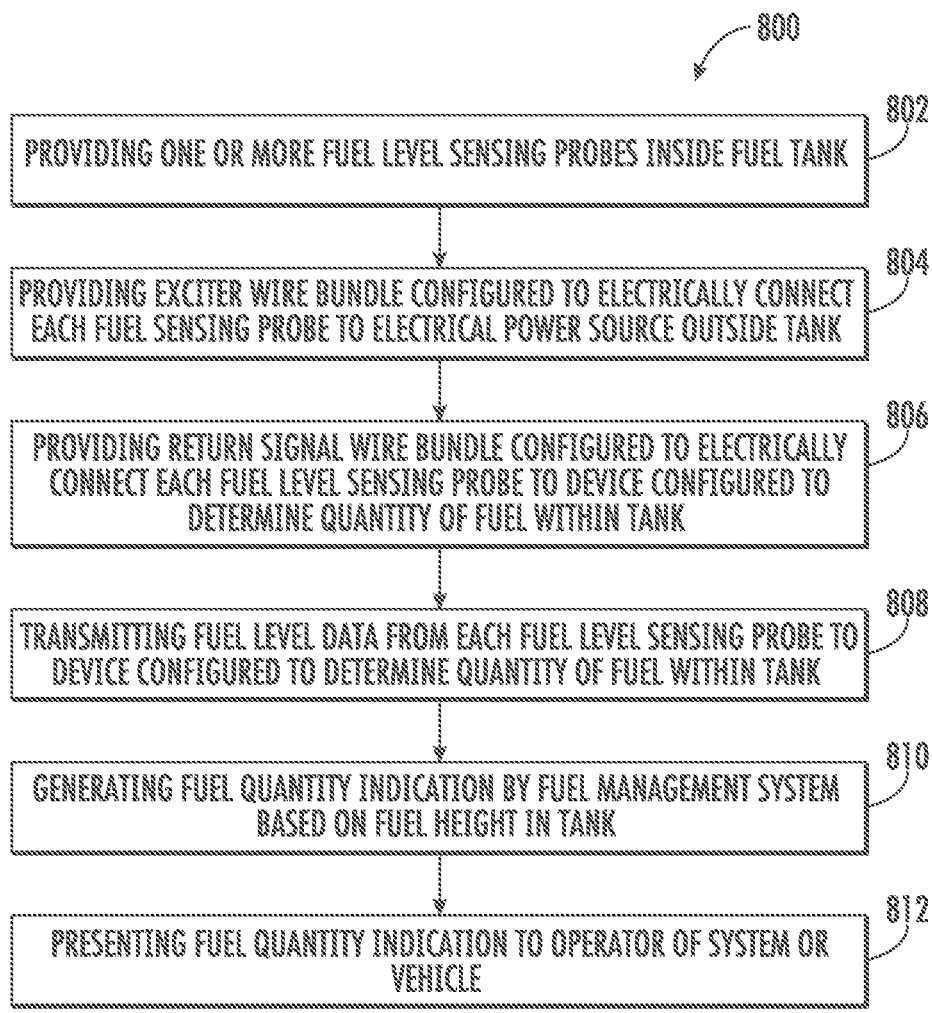
FIG. 8 is a flow chart of an example of a method for monitoring a quantity of fuel in a fuel tank in accordance with an example of the present disclosure.

FIG. 8 is a flow chart of an example of a method 800 for monitoring a quantity of fuel in a fuel tank in accordance with an example of the present disclosure. In block 802, the method includes providing one or more fuel level sensing probes inside the fuel tank. In accordance with an example, the fuel level sensing probes are similar to the fuel level sensing probes 106 in FIG. 1.

In block 804, the method 800 includes providing an exciter wire bundle configured to electrically connect the fuel level sensing probe or probes to an electric power source outside the fuel tank. In some examples, the exciter wire bundle is similar to the excited wire bundle 108 described with reference to FIG. 1. The exciter wire bundle includes an excitation wire or wires and a grounded guard wire or wires configured to prevent electromagnetic interference from the excitation wire or wires. Each excitation wire and the grounded guard wire includes a resistive non-metallic wire.

In block 806, the method 800 includes providing a return signal wire bundle configured to electrically connect the fuel level sensing probe or probes to a device configured to determine or measure a quantity of fuel within the fuel tank by using a return signal from each fuel level sensing probe. In some examples, the return signal wire bundle is the same or similar to the return signal wire bundle 116 described with reference to FIG. 1. The return signal wire bundle includes a return signal wire or wires and a grounded guard wire or wires configured to shield the return signal wire or wires from electromagnetic interference. Each return signal wire and grounded guard wire includes a resistive non-metallic wire.

In block 808, the method 800 includes transmitting fuel level data from each fuel level sensing probe to a device configured to measure or determine a quantity of fuel in the fuel tank.

In block 810, the method 800 includes generating a fuel quantity indication by a fuel management system based on fuel height or fuel level in the tank.

In block 812, the method 800 includes presenting the fuel quantity indication to an operator of the vehicle or system. In an example where the vehicle is an aircraft, the fuel quantity indication is presented on a display in a cockpit of the aircraft to a pilot.

Further, the disclosure comprises examples according to the following clauses:

Clause 1. A system, comprising:
a fuel level sensing probe inside a fuel tank;
an exciter wire bundle configured to electrically connect the fuel level sensing probe to an electric power source outside the fuel tank, wherein the exciter wire bundle comprises an excitation wire and a grounded guard wire, and wherein the excitation wire and the grounded guard wire each comprise a resistive non-metallic wire; and
a return signal wire bundle configured to electrically connect the fuel level sensing probe to a device configured to measure a quantity of fuel within the fuel tank by using a return signal from the fuel level sensing probe, wherein the return signal wire bundle comprises a return signal wire and a grounded guard wire, and wherein the grounded guard wire of the return signal wire bundle and the grounded guard wire of the exciter wire bundle are configured to shield the return signal wire from electromagnetic interference, and wherein the return signal wire and the grounded guard wire each comprise a resistive non-metallic wire.

Clause 2. The system of clause 1, further comprising:

a plurality of fuel level sensing probes disposed at predetermined different locations within the fuel tank to accurately measure the quantity of fuel within the fuel tank;

wherein the exciter wire bundle comprises a plurality of excitation wires and one or more grounded guard wires and wherein each excitation wire is electrically connected to a respective one of the plurality of fuel level sensing probes; and wherein the return signal wire bundle comprises a plurality of return signal wires and one or more grounded guard wires and wherein each return signal wire is electrically connected to a respective one of the plurality of fuel level sensing probes.

Clause 3. The system of clause 1 or 2, wherein the exciter wire bundle comprises a single grounded guard wire.

Clause 4. The system of any of clauses 1-2 or 3, wherein the single grounded guard wire and the plurality of excitation wires are twisted together to form the exciter wire bundle and to shield the return signal wires from the electromagnetic interference.

Clause 5. The system of any of clauses 1-3 or 4, wherein the return signal wire bundle comprises a single grounded guard wire.

Clause 6. The system of any of clauses 1-4 or 5, wherein the single grounded guard wire and the plurality of return signal wires are twisted together to form the return signal wire bundle and to shield the return signal wires from the electromagnetic interference.

Clause 7. The system of any of clauses 1-5 or 6, wherein the exciter wire bundle comprises a plurality of grounded guard wires.

Clause 8. The system of any of clauses 1-6 or 7, wherein each grounded guard wire forms a twisted pair with one of the plurality of excitation wires to form the exciter wire bundle and to shield the return signal wires from the electromagnetic interference.

Clause 9. The system of any of clauses 1-7 or 8, wherein the return signal wire bundle comprises a plurality of grounded guard wires.

Clause 10. The system of any of clauses 1-8 or 9, wherein each grounded guard wire forms a twisted pair with one of the plurality of return signal wires to form the return signal wire bundle and to shield the return signal wires from the electromagnetic interference.

Clause 11. The system of any of clauses 1-9 or 10, further comprising a sealed connector extending through a wall of the fuel tank, wherein the sealed connector is configured to electrically connect the plurality of excitation wires to the electric power source and the plurality of return signal wires to the device configured to measure the quantity of fuel within the fuel tank.

Clause 12. The system of any of clauses 1-9 or 10, further comprising:

a first sealed connector extending through a wall of the fuel tank, wherein the first sealed connector is configured to electrically connect the plurality of excitation wires to the electrical power source; and a second sealed connector extending through a wall of the fuel tank, wherein the second sealed connector is configured to electrically connect the plurality of return signal wires to the device configured to measure the quantity of fuel within the fuel tank.

Clause 13. The system of any of clauses 1-9 or 10, further comprising a plurality of sealed connectors, one sealed connector associated with each fuel level sensing probe, wherein each sealed connector extends through a wall of the fuel tank and is configured to electrically connect the excitation wire connected to an associated fuel level sensing probe to the electrical power source and to electrically connect the return signal wire connected to the associated fuel level sensing probe to the device configured to measure the quantity of fuel within the tank.

Clause 14. The system of any of clauses 1-12 or 13, wherein the exciter wire bundle and the return signal wire bundle are spaced a predetermined distance apart to prevent electromagnetic interference between the exciter wire bundle and the return signal wire bundle.

Clause 15. The system of any of clauses 1-13 or 14, further comprising a clamp assembly configured to fasten the exciter wire bundle and the return signal wire bundle to a grounded structure of the fuel tank and to space the bundles a predetermined distance apart to prevent electromagnetic interference between the exciter wire bundle and the return signal wire bundle.

Clause 16. A vehicle, comprising:

a fuel tank; and a system for measuring a quantity of fuel in the fuel tank, wherein the system comprises:

a fuel level sensing probe inside the fuel tank;

an exciter wire bundle configured to electrically connect the fuel level sensing probe to an electric power source outside the fuel tank, wherein the exciter wire bundle comprises an excitation wire and a grounded guard wire, and wherein the excitation wire and the grounded guard wire comprise a resistive non-metallic wire; and a return signal wire bundle configured to electrically connect the fuel level sensing probe to a device configured to measure a quantity of fuel within the fuel tank by using a return signal from the fuel level sensing probe, wherein the return signal wire bundle comprises a return signal wire and a grounded guard wire, and wherein the grounded guard wire of the return signal wire bundle and the grounded guard wire of the exciter wire bundle are configured to shield the return signal wire from electromagnetic interference, and wherein the return signal wire and the grounded guard wire comprise a resistive non-metallic wire.

Clause 17. The vehicle of claim 16, wherein the system comprises:

a plurality of fuel level sensing probes disposed at predetermined different locations with the fuel tank to accurately measure the quantity of fuel within the fuel tank;

wherein the exciter wire bundle comprises a plurality of excitation wires and one or more grounded guard wires and wherein each excitation wire is electrically connected to a respective one of the plurality of fuel level sensing probes; and wherein the return signal wire bundle comprises a plurality of return signal wires and one or more grounded guard wires and wherein each return signal wire is electrically connected to a respective one of the plurality of fuel level sensing probes.

Clause 18. The vehicle of clause 16 or 17, wherein the exciter wire bundle comprises a single grounded guard wire.

Clause 19. The vehicle of any of clauses 16-17 or 18, wherein the single grounded guard wire and the plurality of excitation wires are twisted together to form the exciter wire bundle and to shield the return signal wires from the electromagnetic interference.

Clause 20. The vehicle of any of clauses 16-18 or 19, wherein the return signal wire bundle comprises a single grounded guard wire.

Clause 21. The vehicle of any of clauses 16-19 or 20, wherein the single grounded guard wire and the plurality of return signal wires are twisted together to form the return signal wire bundle and to shield the return signal wires from the electromagnetic interference.

Clause 22. The vehicle of any of clauses 16-20 or 21, wherein the exciter wire bundle comprises a plurality of grounded guard wires.

Clause 23. The vehicle of any of clauses 16-21 or 22, wherein each grounded guard wire forms a twisted pair with one of the plurality of excitation wires to form the exciter wire bundle and to shield the return signal wires from the electromagnetic interference.

Clause 24. The vehicle of any of clauses 16-22 or 23, wherein the return signal wire bundle comprises a plurality of grounded guard wires.

Clause 25. The vehicle of any of clauses 16-23 or 24, wherein each grounded guard wire forms a twisted pair with one of the plurality of return signal wires to form the return signal wire bundle and to shield the return signal wires from the electromagnetic interference.

Clause 26. The vehicle of any of clauses 16-24 or 25, further comprising a sealed connector extending through a wall of the fuel tank, wherein the sealed connector is configured to electrically connect the plurality of excitation wires to the electric power source and the plurality of return signal wires to the device configured to measure the quantity of fuel within the fuel tank.

Clause 27. The vehicle of any of clauses 16-24 or 25, further comprising:

a first sealed connector extending through a wall of the fuel tank, wherein the first sealed connector is configured to electrically connect the plurality of excitation wires to the electrical power source; and a second sealed connector extending through a wall of the fuel tank, wherein the second sealed connector is configured to electrically connect the plurality of return signal wires to the device configured to measure the quantity of fuel within the fuel tank.

Clause 28. The vehicle of any of clauses 16-24 or 25, further comprising a plurality of sealed connectors, one sealed connector associated with each fuel level sensing probe, wherein each sealed connector extends through a wall of the fuel tank and is configured to electrically connect the excitation wire connected to an associated fuel level sensing probe to the electrical power source and to electrically connect the return signal wire connected to the associated fuel level sensing probe to the device configured to measure the quantity of fuel within the tank.

Clause 29. The vehicle of any of clauses 16-27 or 28, wherein the exciter wire bundle and the return signal wire bundle are spaced a predetermined distance apart to prevent electromagnetic interference between the exciter wire bundle and the return signal wire bundle.

Clause 30. The vehicle of any of clauses 16-28 or 29, further comprising a clamp assembly configured to fasten the exciter wire bundle and the return signal wire bundle to a grounded structure of the fuel tank and to space the bundles a predetermined distance apart to prevent electromagnetic interference between the exciter wire bundle and the return signal wire bundle.

Clause 31. The vehicle of any of clauses 16 or 17, wherein the exciter wire bundle and the return signal wire bundle each comprise a single grounded guard wire and wherein the single grounded guard wire of the exciter wire bundle and the plurality of excitation wires are twisted together to form the exciter wire bundle and to shield the return signal wires from the electromagnetic interference, and the single grounded guard wire of the return signal wire bundle and the plurality of return signal wires are twisted together to form the return signal wire bundle and to shield the return signal wires from the electromagnetic interference.

Clause 32. The vehicle of any of clauses 16 or 17, wherein the exciter wire bundle comprises a plurality of grounded guard wires and the return signal wire bundle comprises a plurality of grounded guard wires, and wherein each grounded guard wire of the exciter wire bundle forms a twisted pair with one of the plurality of excitation wires to form the exciter wire bundle and to shield the return signal wires from the electromagnetic interference, and wherein each grounded guard wire of the return signal wire bundle forms a twisted pair with one of the plurality of return signal wires to form the return signal wire bundle and to shield the return signal wires from the electromagnetic interference.

Clause 33. A method for monitoring a quantity of fuel in a fuel tank, comprising:

providing one or more fuel level sensing probes inside a fuel tank;

providing an exciter wire bundle configured to electrically connect the fuel level sensing probe to an electric power source outside the fuel tank, wherein the exciter wire bundle comprises an excitation wire and a grounded guard wire, and wherein the excitation wire and the grounded guard wire comprise a resistive non-metallic wire; and providing a return signal wire bundle configured to electrically connect the fuel level sensing probe to a device configured to measure a quantity of fuel within the fuel tank by using a return signal from the fuel level sensing probe, wherein the return signal wire bundle comprises a return signal wire and a grounded guard wire, and wherein the grounded guard wire of the return signal wire bundle and the grounded guard wire of the exciter wire bundle are configured to shield the return signal wire from electromagnetic interference, and wherein the return signal wire and the grounded guard wire comprise a resistive non-metallic wire.

Clause 34. The method of clause 33, further comprising transmitting fuel level data from each fuel level sensing probe to a device configured to measure or determine a quantity of fuel in the fuel tank.

Clause 35. The method of any of clauses 33 or 34, further comprising generating a fuel quantity indication by a fuel management system based on fuel height or fuel level in the tank.

Clause 36. The method of any of clauses 33-34 or 35, further comprising presenting the fuel quantity indication to an operator of the vehicle or system. In an example where the vehicle is an aircraft, the fuel quantity indication is presented on a display in a cockpit of the aircraft to a pilot.

Clause 37. The method of any of clauses 33-35 or 36, further comprising:

a plurality of fuel level sensing probes disposed at predetermined different locations within the fuel tank to accurately measure the quantity of fuel within the fuel tank;

wherein the exciter wire bundle comprises a plurality of excitation wires and one or more grounded guard wires and wherein each excitation wire is electrically connected to a respective one of the plurality of fuel level sensing probes; and wherein the return signal wire bundle comprises a plurality of return signal wires and one or more grounded guard wires and wherein each return signal wire is electrically connected to a respective one of the plurality of fuel level sensing probes.

Clause 38. The method of any of clauses 33-36 or 37, wherein the exciter wire bundle comprises a single grounded guard wire.

Clause 39. The method of any of clauses 33-37 or 38, wherein the single grounded guard wire and the plurality of excitation wires are twisted together to form the exciter wire bundle and to shield the return signal wires from the electromagnetic interference.

Clause 40. The method of any of clauses 33-38 or 39, wherein the return signal wire bundle comprises a single grounded guard wire.

Clause 41. The method of any of clauses 33-39 or 40, wherein the single grounded guard wire and the plurality of return signal wires are twisted together to form the return signal wire bundle and to shield the return signal wires from the electromagnetic interference.

Clause 42. The method of any of clauses 33-40 or 41, wherein the exciter wire bundle comprises a plurality of grounded guard wires.

Clause 43. The system of any of clauses 33-41 or 42, wherein each grounded guard wire forms a twisted pair with one of the plurality of excitation wires to form the exciter wire bundle and to shield the return signal wires from the electromagnetic interference.

Clause 44. The method of any of clauses 33-42 or 43, wherein the return signal wire bundle comprises a plurality of grounded guard wires.

Clause 45. The method of any of clauses 33-43 or 44, wherein each grounded guard wire forms a twisted pair with one of the plurality of return signal wires to form the return signal wire bundle and to shield the return signal wires from the electromagnetic interference.

Clause 46. The method of any of clauses 33-44 or 45, further comprising a sealed connector extending through a wall of the fuel tank, wherein the sealed connector is configured to electrically connect the plurality of excitation wires to the electric power source and the plurality of return signal wires to the device configured to measure the quantity of fuel within the fuel tank.

Clause 47. The method of any of clauses 33-44 or 45, further comprising:
a first sealed connector extending through a wall of the fuel tank, wherein the first sealed connector is configured to electrically connect the plurality of excitation wires to the electrical power source; and a second sealed connector extending through a wall of the fuel tank, wherein the second sealed connector is configured to electrically connect the plurality of return signal wires to the device configured to measure the quantity of fuel within the fuel tank.

Clause 48. The method of any of clauses 33-44 or 45, further comprising a plurality of sealed connectors, one sealed connector associated with each fuel level sensing probe, wherein each sealed connector extends through a wall of the fuel tank and is configured to electrically connect the excitation wire connected to an associated fuel level sensing probe to the electrical power source and to electrically connect the return signal wire connected to the associated fuel level sensing probe to the device configured to measure the quantity of fuel within the tank.

Clause 49. The method of any of clauses 33-47 or 48, wherein the exciter wire bundle and the return signal wire bundle are spaced a predetermined distance apart to prevent electromagnetic interference between the exciter wire bundle and the return signal wire bundle.

Clause 50. The method of any of clauses 33-48 or 49, further comprising a clamp assembly configured to fasten the exciter wire bundle and the return signal wire bundle to a grounded structure of the fuel tank and to space the bundles a predetermined distance apart to prevent electromagnetic interference between the exciter wire bundle and the return signal wire bundle.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose may be substituted for the specific examples shown and that the examples have other applications in other environments. This application is intended to cover any adaptations or variations. The following claims are in no way intended to limit the scope of examples of the disclosure to the specific examples described herein.

What is claimed is:

1. A system, comprising:
a fuel level sensing probe inside a fuel tank;
an exciter wire bundle configured to electrically connect the fuel level sensing probe to an electric power source outside the fuel tank, wherein the exciter wire bundle comprises a plurality of excitation wires and a grounded guard wire, and wherein each excitation wire of the exciter wire bundle and the grounded guard wire of the exciter wire bundle comprise a resistive non-metallic wire;

a return signal wire bundle configured to electrically connect the fuel level sensing probe to a device configured to measure a quantity of fuel within the fuel tank by using a return signal from the fuel level sensing probe, wherein the return signal wire bundle comprises a plurality of return signal wires and a grounded guard wire, wherein the grounded guard wire of the return signal wire bundle and the grounded guard wire of the exciter wire bundle are configured to shield each return signal wire of the return signal wire bundle from electromagnetic interference, and wherein each return signal wire of the return signal wire bundle and the grounded guard wire of the return signal wire bundle comprise a resistive non-metallic wire;

a first sealed connector extending through a wall of the fuel tank, the first sealed connector being configured to electrically connect the plurality of excitation wires to the electrical power source; and a second sealed connector extending through the wall of the fuel tank, the second sealed connector being configured to electrically connect the plurality of return signal wires to the device.

2. The system of claim 1, further comprising:
a plurality of fuel level sensing probes disposed at predetermined different locations within the fuel tank to accurately measure the quantity of fuel within the fuel tank;
wherein the exciter wire bundle comprises the plurality of excitation wires and one or more grounded guard wires and wherein each excitation wire is electrically connected to a respective one of the plurality of fuel level sensing probes; and
wherein the return signal wire bundle comprises the plurality of return signal wires and one or more grounded guard wires and wherein each return signal wire is electrically connected to a respective one of the plurality of fuel level sensing probes.

3. The system of claim 2, wherein the exciter wire bundle comprises a single grounded guard wire.

4. The system of claim 3, wherein the single grounded guard wire and the plurality of excitation wires are twisted together to form the exciter wire bundle and to shield the return signal wires from the electromagnetic interference.

5. The system of claim 2, wherein the return signal wire bundle comprises a single grounded guard wire.

6. The system of claim 5, wherein the single grounded guard wire and the plurality of return signal wires are twisted together to form the return signal wire bundle and to shield the return signal wires from the electromagnetic interference.

7. The system of claim 2, wherein the exciter wire bundle comprises a plurality of grounded guard wires.

8. The system of claim 7, wherein each grounded guard wire forms a twisted pair with one of the plurality of excitation wires to form the exciter wire bundle and to shield the return signal wires from the electromagnetic interference.

9. The system of claim 2, wherein the return signal wire bundle comprises a plurality of grounded guard wires.

10. The system of claim 9, wherein each grounded guard wire forms a twisted pair with one of the plurality of return signal wires to form the return signal wire bundle and to shield the return signal wires from the electromagnetic interference.

11. The system of claim 1, wherein the exciter wire bundle and the return signal wire bundle are spaced a predetermined distance apart to prevent electromagnetic interference between the exciter wire bundle and the return signal wire bundle.

12. The system of claim 1, further comprising a clamp assembly configured to fasten the exciter wire bundle and the return signal wire bundle to a grounded structure of the fuel tank and to space the bundles a predetermined distance apart to prevent electromagnetic interference between the exciter wire bundle and the return signal wire bundle.

13. A vehicle, comprising:
a fuel tank; and
a system for measuring a quantity of fuel in the fuel tank, wherein the system comprises:
a fuel level sensing probe inside the fuel tank;
an exciter wire bundle configured to electrically connect the fuel level sensing probe to an electric power source outside the fuel tank, wherein the exciter wire bundle comprises a plurality of excitation wires and a grounded guard wire, and wherein each excitation wire of the exciter wire bundle and the grounded guard wire of the exciter wire bundle comprise a resistive non-metallic wire;
a return signal wire bundle configured to electrically connect the fuel level sensing probe to a device configured to measure a quantity of fuel within the fuel tank by using a return signal from the fuel level sensing probe, wherein the return signal wire bundle comprises a plurality of return signal wires and a grounded guard wire, wherein the grounded guard wire of the return signal wire bundle and the grounded guard wire of the exciter wire bundle are configured to shield each return signal wire of the return signal wire bundle from electromagnetic interference, and wherein each return signal wire of the return signal wire bundle and the grounded guard wire of the return signal wire bundle comprise a resistive non-metallic wire;
a first sealed connector extending through a wall of the fuel tank, wherein the first sealed connector is configured to electrically connect the plurality of excitation wires to the electrical power source; and
a second sealed connector extending through the wall of the fuel tank, wherein the second sealed connector is configured to electrically connect the plurality of return signal wires to the device.

14. The vehicle of claim 13, wherein the system comprises:
a plurality of fuel level sensing probes disposed at predetermined different locations with within the fuel tank to accurately measure the quantity of fuel within the fuel tank;
wherein the exciter wire bundle comprises the plurality of excitation wires and one or more grounded guard wires and wherein each excitation wire is electrically connected to a respective one of the plurality of fuel level sensing probes; and
wherein the return signal wire bundle comprises the plurality of return signal wires and one or more grounded guard wires and wherein each return signal wire is electrically connected to a respective one of the plurality of fuel level sensing probes.

15. The vehicle of claim 14, wherein the exciter wire bundle and the return signal wire bundle each comprise a single grounded guard wire and wherein the single grounded guard wire of the exciter wire bundle and the plurality of excitation wires are twisted together to form the exciter wire bundle and to shield the return signal wires from the electromagnetic interference, and the single grounded guard wire of the return signal wire bundle and the plurality of return signal wires are twisted together to form the return signal wire bundle and to shield the return signal wires from the electromagnetic interference.

16. The vehicle of claim 14, wherein the exciter wire bundle comprises a plurality of grounded guard wires and the return signal wire bundle comprises a plurality of grounded guard wires, wherein each grounded guard wire of the exciter wire bundle forms a twisted pair with one of the plurality of excitation wires to form the exciter wire bundle and to shield the return signal wires from the electromagnetic interference, and wherein each grounded guard wire of the return signal wire bundle forms a twisted pair with one of the plurality of return signal wires to form the return signal wire bundle and to shield the return signal wires from the electromagnetic interference.

17. A method, comprising:

providing one or more fuel level sensing probes inside a fuel tank;

providing an exciter wire bundle configured to electrically connect the fuel level sensing probe to an electric power source outside the fuel tank, the exciter wire bundle comprises a plurality of excitation wires and a grounded guard wire, and wherein each excitation wire of the exciter wire bundle and the grounded guard wire of the exciter wire bundle comprise a resistive non-metallic wire;

providing a return signal wire bundle configured to electrically connect the fuel level sensing probe to a device configured to measure a quantity of fuel within the fuel tank by using a return signal from the fuel level sensing probe, wherein the return signal wire bundle comprises a a plurality of return signal wires and a grounded guard wire, wherein the grounded guard wire of the return signal wire bundle and the grounded guard wire of the exciter wire bundle are configured to shield each return signal wire of the return signal wire bundle from electromagnetic interference, and wherein each return signal wire of the return signal wire bundle and the grounded guard wire of the return signal wire bundle comprise a resistive non-metallic wire;

providing a first sealed connector extending through a wall of the fuel tank, wherein the first sealed connector is configured to electrically connect the plurality of excitation wires to the electrical power source; and providing a second sealed connector extending through the wall of the fuel tank, wherein the second sealed connector is configured to electrically connect the plurality of return signal wires to the device.

* * * * *